United States Patent
Dai et al.

(10) Patent No.: US 10,241,632 B2
(45) Date of Patent: Mar. 26, 2019

(54) TOUCH DETECTING METHOD, TOUCH DETECTING SYSTEM AND TOUCH TERMINAL FOR TOUCH SENSOR

(71) Applicant: SHENZHEN GOODIX TECHNOLOGY CO., LTD., Shenzhen (CN)

(72) Inventors: Lei Dai, Shenzhen (CN); Zhenyu Zhong, Shenzhen (CN); Jinchun Ye, Shenzhen (CN); Haolei Wang, Shenzhen (CN); Xiaoxiang Chen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/700,123

(22) Filed: Sep. 9, 2017

(65) Prior Publication Data

US 2017/0371455 A1 Dec. 28, 2017

Related U.S. Application Data

(60) Division of application No. 14/552,896, filed on Nov. 25, 2014, and a continuation of application No. PCT/CN2013/085564, filed on Oct. 21, 2013.

(30) Foreign Application Priority Data

Nov. 27, 2012 (CN) .......................... 2012 1 0491121

(51) Int. Cl.
   G06F 3/041 (2006.01)
   G06F 3/044 (2006.01)

(52) U.S. Cl.
   CPC ............ *G06F 3/044* (2013.01); *G06F 3/0416* (2013.01)

(58) Field of Classification Search
   CPC .............................. G06F 3/0416; G06F 3/044
   See application file for complete search history.

(56) References Cited

U.S. PATENT DOCUMENTS

| 5,825,352 A | 10/1998 | Bisset et al. |
| 2010/0245286 A1* | 9/2010 | Parker .................. G06F 3/0416 345/174 |

(Continued)

FOREIGN PATENT DOCUMENTS

| CN | 101833121 A | 9/2010 |
| CN | 101840293 A | 9/2010 |

(Continued)

OTHER PUBLICATIONS

International Search Report for International Application No. PCT/CN2013/085564, Applicant: Shenzhen Goodix Technology Co., Ltd., dated Jan. 30, 2014, 3 pages.

(Continued)

*Primary Examiner* — Ariel A Balaoing

(57) ABSTRACT

The present disclosure relates to a touch technology field, provides a touch detecting method for a touch sensor, the method comprises the following steps: putting the touch sensor into a mutual capacitance mode and a self capacitance mode alternatively, and scanning and detecting the rows and columns of a capacitance array of the touch sensor; when a touch state is preliminarily judged as no touch according to a scanning and detecting result in the mutual capacitance mode, implementing envelopment analysis for data obtained by sampling in the self capacitance mode and determining whether the touch exists in the mutual capacitance mode, updating no reference in the mutual capacitance mode if the touch exists, and updating the reference in the mutual capacitance mode if no touch exists.

6 Claims, 12 Drawing Sheets

(56) References Cited

U.S. PATENT DOCUMENTS

| | | | | |
|---|---|---|---|---|
| 2010/0328262 | A1* | 12/2010 | Huang | G06F 3/0416 345/174 |
| 2011/0025629 | A1* | 2/2011 | Grivna | G06F 3/0416 345/173 |
| 2011/0175835 | A1 | 7/2011 | Wang | |
| 2012/0038584 | A1 | 2/2012 | Liu | |
| 2013/0093712 | A1 | 4/2013 | Liu et al. | |

FOREIGN PATENT DOCUMENTS

| | | | |
|---|---|---|---|
| CN | 101887332 | A | 11/2010 |
| CN | 101887336 | A | 11/2010 |
| CN | 102023768 | A | 4/2011 |
| WO | 2011088726 | A1 | 7/2011 |

OTHER PUBLICATIONS

Notice of References Cited for U.S. Appl. No. 14/552,896, Applicant: Shenzhen Goodix Technology Co., Ltd., dated Jul. 15, 2016, 1 page.

Office Action and Search Report for CN Application No. 21210491121. 1, Applicant: Shenzhen Goodix Technology Co., Ltd., dated Feb. 27, 2015, 7 pages.

* cited by examiner

| 21 | 29 | 56 | 39 | 26 | 21 | 11 |
|---|---|---|---|---|---|---|
| 39 | 102 | 255 | 235 | 37 | 0 | 17 |
| 11 | 252 | 176 | 145 | 153 | 65 | 25 |
| 9 | 172 | 159 | 130 | 135 | 215 | 67 |
| 13 | 0 | 68 | 200 | 212 | 255 | 47 |
| 14 | 9 | 12 | 31 | 114 | 61 | 24 |
| 6 | 16 | 25 | 26 | 31 | 19 | 12 |

FIG. 3

| 10 | 8 | 0 | 1 | 1 | 0 | 5 |
|---|---|---|---|---|---|---|
| 0 | 35 | 175 | 55 | 0 | 0 | 7 |
| 0 | 141 | 23 | 0 | 2 | 0 | 6 |
| 0 | 80 | 0 | 0 | 2 | 85 | 12 |
| 0 | 0 | 13 | 13 | 64 | 158 | 28 |
| 6 | 0 | 0 | 63 | 175 | 32 | 18 |
| 6 | 2 | 3 | 6 | 2 | 3 | 4 |

TOUCH DETECTING METHOD, TOUCH DETECTING SYSTEM AND TOUCH TERMINAL FOR TOUCH SENSOR

CROSS REFERENCE TO RELATED APPLICATIONS

This application is a Divisional Application of U.S. patent application Ser. No. 14/552,896, filed on Nov. 25, 2014, which is a continuation of International Application No. PCT/CN2013/085564, filed on Oct. 21, 2013. The International Application claims priority to Chinese Patent Application No. 201210491121.1, filed on Nov. 27, 2012. All of the aforementioned patent applications are hereby incorporated by reference in their entireties.

TECHNICAL FIELD

The present disclosure relates to a touch control technology field, in particular, to a touch detecting method, touch detecting system and touch terminal for a touch sensor.

BACKGROUND

At present, touch detection technology for capacitive touch sensors mainly includes two kinds: the mutual capacitance detection and the self capacitance detection. Because the mutual capacitance detection has the feature of multi-touch, the mutual capacitance detection becomes the mainstream of the capacitive touch detection technology. However the mutual capacitance detection has some defects, such as the floating effect. The floating effect means the touch terminal is on the surface of a high insulation object; non-floating means a person contacts the touch terminal or a system ground with large area exists in the touch terminal. The floating effect means the phenomenon that when a touch is executed through a larger finger such as the thumb, while the touch area is smaller than that caused by other fingers. With the higher and higher user experience requirement, the floating effect has become the most important defect in the performance of the product using the mutual capacitance detection.

The principal of the floating effect of the mutual capacitance is shown in FIGS. 1 and 2, in the figures, $R_h$ and $C_h$ are respectively the impedance and capacitive reactance between the body and ground, two fingers touch different nodes. FIG. 1 is the principle diagram of the mutual capacitance in non-floating state. In the non-floating state, because $C_h$ is large, a signal has a larger coupling with the ground through the $R_h$ and $C_h$, thereby reducing the node capacitance by cutting the magnetic sensing line off, and detecting a corresponding variation. FIG. 2 is the principle diagram of the mutual capacitance in floating state. In the floating state, $C_h$ is very small, the signal can hardly pass $C_h$, a drive signal for D1 is coupled to the sensing line S1 through the capacitance at node A, and the signal in S1 is finally coupled to the sensing line S2 through the capacitance at node C, finger and node B, such that the capacitance detected from S2 is larger compared to the capacitance in the non-floating state. When the press is executed by the thumb or an object with large area, the unexpected phenomenon that the capacitance at the center of the position of the press increases while the peripheral capacitance decreases will appear due to the floating effect.

The problem caused by the floating effect is mainly that using the thumb to press will cause point-split and judgment for the large area is difficult. The point-split means in the floating state, when the capacitive touch screen is touched by the object with large area (for example the thumb), the touch is considered as the multi-touch because of the signal cancellation. Referring to FIG. 3, in the non-floating state, when the touch executed by single finger causes large press area, it judges that one finger (the box drawn by bold lines in FIG. 3) exists though the mutual capacitance detection, and this judgment is correct. But in the floating state, referring to FIG. 4, when the touch executed by single finger causes large press area, it judges incorrectly that two fingers (two boxes drawn by bold lines in FIG. 4) exist. The method to solve that problem comprises using a metal housing, increasing the ground area of the device, reducing the coupling capacitances between the driving means and the finger, and the sensing means and the finger. The metal housing has the limitation that it must be contacted by the fingers, increasing the ground area has the product limitation, and reducing the coupling capacitances between the driving means and the finger, and the sensing means and the finger will affect the signal-to-noise ratio. Hence, all the existing methods can't resolve that problem fundamentally.

SUMMARY

Aiming at the defects existing in the prior art, the present disclosure provides a touch detecting method for a touch sensor, which improves the accuracy of a touch detection result of the touch sensor, particularly the accuracy of the detection result for distinguishing whether the touch is the single touch or the multi-touch in the case that the touch terminal is subjected to a large area touch in a floating state.

The present disclosure uses the following technical solution:

a touch detecting method for a touch sensor, wherein the method comprises the following steps: putting the touch sensor into a mutual capacitance mode and a self capacitance mode alternatively, and scanning and detecting the rows and columns of a capacitance array of the touch sensor; when a touch state is preliminarily judged as a multi-touch according to a scanning and detecting result in the mutual capacitance mode, implementing envelopment analysis for data obtained by sampling in the self capacitance mode, determining whether the touch state in the mutual capacitance mode is a single touch or the multi-touch, outputting one touch coordinate if the touch state is the single touch; and outputting a plurality of touch coordinates if the touch state is the multi-touch.

The present disclosure further provides a touch detecting method for a touch sensor, wherein the method comprises the following steps: putting the touch sensor into a mutual capacitance mode and a self capacitance mode alternatively, and scanning and detecting the rows and columns of a capacitance array of the touch sensor; when a touch state is preliminarily judged as no touch according to a scanning and detecting result in the mutual capacitance mode, implementing envelopment analysis for data obtained by sampling in the self capacitance mode and determining whether the touch exists in the mutual capacitance mode, updating no reference in the mutual capacitance mode if the touch exists, and updating the reference in the mutual capacitance mode if no touch exists.

The present disclosure further provides a touch detecting method for a touch sensor, wherein the method comprises the following steps: putting the touch sensor into a mutual capacitance mode and a self capacitance mode alternatively, and scanning and detecting the rows and columns of a capacitance array of the touch sensor; finding all envelopes by implementing envelopment analysis for data obtained by sampling in the self capacitance mode; judging whether a width of an region of one of the envelopes exceeds a preset second threshold, if the width of the region exceeds the preset second threshold, determining a touch corresponding to the envelope is a hand touch and the region corresponding to the data obtained by sampling in the mutual capacitance mode is illegal, and implementing no coordinate calculation for the region corresponding to the data obtained by sampling in the mutual capacitance mode; else determining the touch corresponding to the envelope is a finger touch and the region corresponding to the data obtained by sampling in the mutual capacitance mode is legal, and implementing a coordinate calculation for the region corresponding to the data obtained by sampling in the mutual capacitance mode.

The present disclosure further provides a touch detecting method for a touch sensor, wherein the method comprises the following steps: putting the touch sensor into a mutual capacitance mode and a self capacitance mode alternatively, and scanning and detecting the rows and columns of a capacitance array of the touch sensor; closing a reference update when a negative value is detected in the mutual capacitance mode and a positive value is detected in the self capacitance mode; and recovering the reference update when no negative value is detected in the mutual capacitance mode.

The present disclosure also provides a touch detecting system for a touch sensor, wherein the system comprises: a mutual capacitance sampling unit, coupled to a mutual capacitance decoding unit and a control unit and configured to sample a mutual capacitance signal; the mutual capacitance decoding unit, coupled to the mutual capacitance sampling unit and the control unit and configured to decode the mutual capacitance signal; a self capacitance sampling unit, coupled to a self capacitance decoding unit and the control unit and configured to sample a self capacitance signal; the self capacitance decoding unit, coupled to the self capacitance sampling unit and the control unit and configured to decode the self capacitance signal; and the control unit, coupled to the self capacitance sampling unit, the mutual capacitance decoding unit, the self capacitance sampling unit and the self capacitance decoding unit respectively, and configured to control alternative detections in a mutual capacitance mode and a self capacitance mode.

The present disclosure further provides a touch control terminal comprising the above mentioned touch detecting system for the touch sensor.

Through the alternative detections in the self capacitance mode and the mutual capacitance mode and using the detecting properties in the self capacitance mode, the present disclosure improves the accuracy of a touch detection result of the touch sensor, particularly the accuracy of the detection result for distinguishing whether the touch is the single touch or the multi-touch in the case that the touch terminal is subjected to a large area touch in a floating state.

BRIEF DESCRIPTION OF THE DRAWINGS

FIG. 3 is the effect schematic diagram of a touch executed by single finger with large area in the mutual capacitance mode in the non-floating state;

FIG. 4 is the effect schematic diagram of a touch executed by single finger with large area in the floating state in the mutual capacitance mode;

FIG. 13 is the effect schematic diagram of the capacitive touch screen which is pressed by an object with large area in the floating state in the mutual capacitance mode;

DETAILED DESCRIPTION

To make the objectives, technical solutions and advantages of the present disclosure clearer, the present disclosure will be further described hereafter with reference to the accompany drawings and embodiments. It shall be understood that, the embodiments described herein are only intended to illustrate but not to limit the present disclosure.

Figure 1:
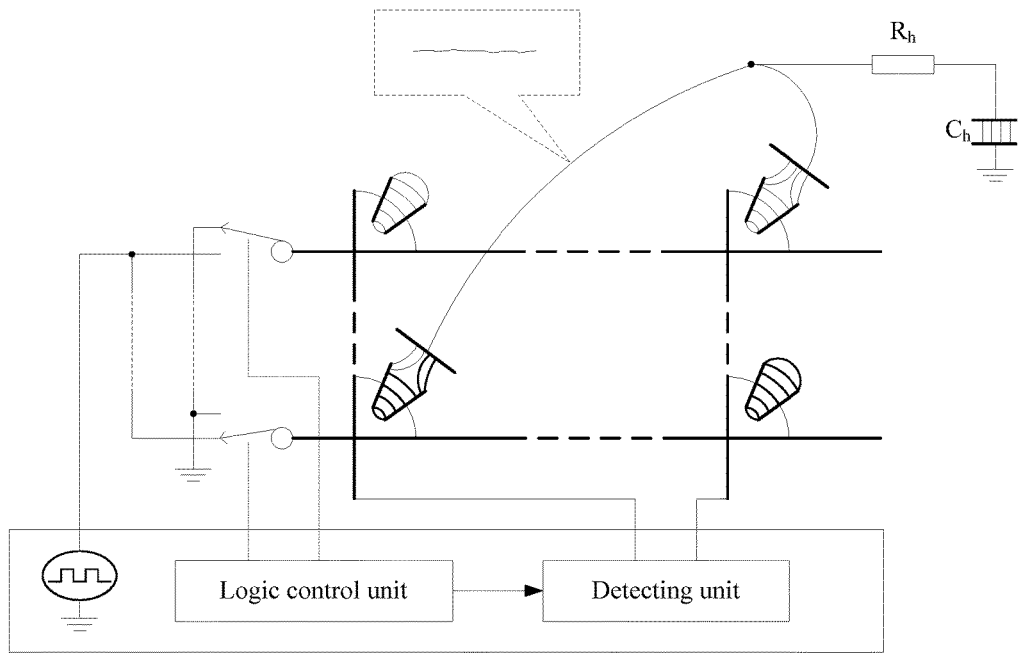
FIG. 1 is the work principle diagram of the mutual capacitance mode in the non-floating state.
Figure 2:
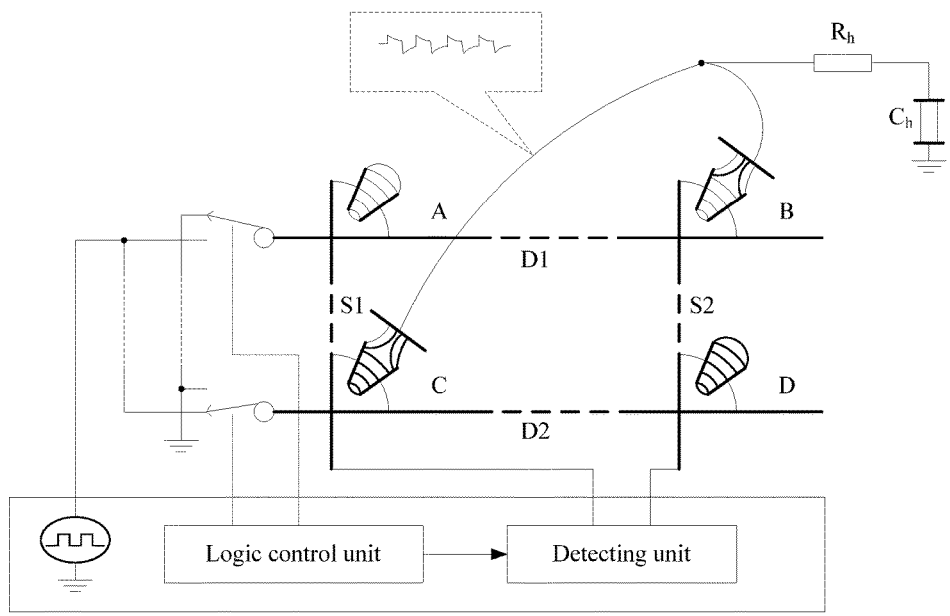
FIG. 2 is the work principle diagram of the mutual capacitance mode in the floating state.
Figure 5:
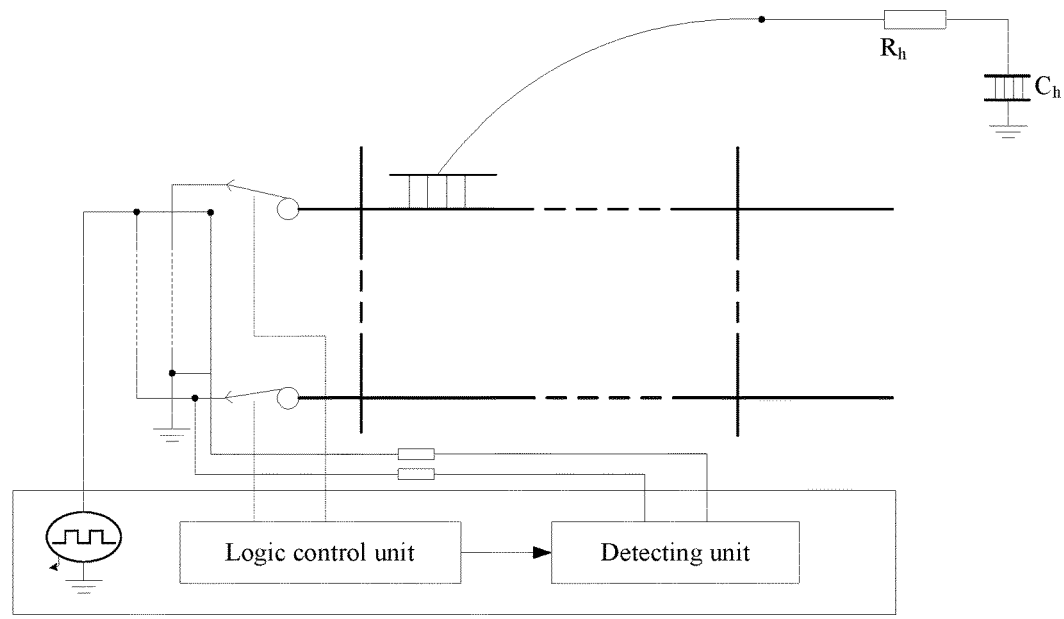
FIG. 5 is the work principle diagram of the self capacitance mode in the floating state.

FIG. 5 is the work principle diagram of the self capacitance mode in the floating state, referring to FIG. 5, in contrast to the detection in mutual capacitance mode, the touch result detected in the self capacitance mode is that the capacitance increases rather than decreases. The larger is the coupling area between the finger and the touch screen, the greater the detected variation is. In the floating state, $C_h$ will also increase, the detected variation in the self capacitance mode will also reduce to some extent, but unlike the mutual capacitance mode, the opposite variation isn't generated. In the embodiments for the present disclosure, the detection properties in the self capacitance mode is used, the data is collected alternatively in the self capacitance mode and the mutual capacitance mode, to improve the floating effect brought by the detection in the mutual capacitance mode, and to reduce the time of sampling in the self capacitance mode, such that the detection time is reasonably and effectively used.

The term "a plurality of" in the following embodiments refers to two or more than two.

Embodiment One

Figure 6:
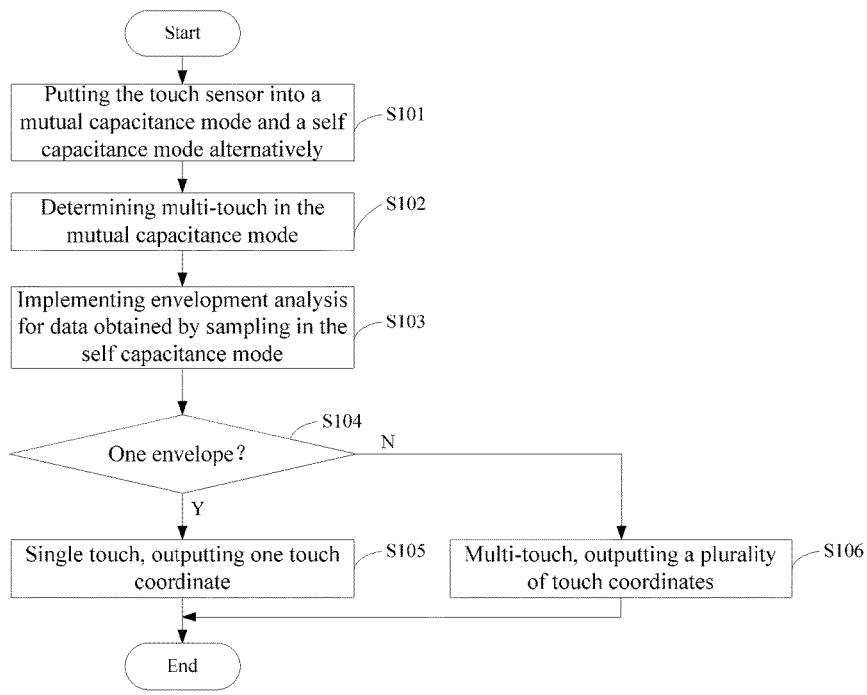
FIG. 6 is a flow chart of a touch detecting method for a touch sensor in the embodiment one of the present disclosure.

Referring to FIG. 6, there is a flow chart of a touch detecting method for a touch sensor in the embodiment one of the present disclosure. By using the detection properties in the self capacitance mode, this embodiment solves the problem of point-split in the floating state in the mutual capacitance mode, therefore the user experience is improved. The detecting method comprises the following steps:

Step S101: putting the touch sensor into a mutual capacitance mode and a self capacitance mode alternatively.

Figure 7:
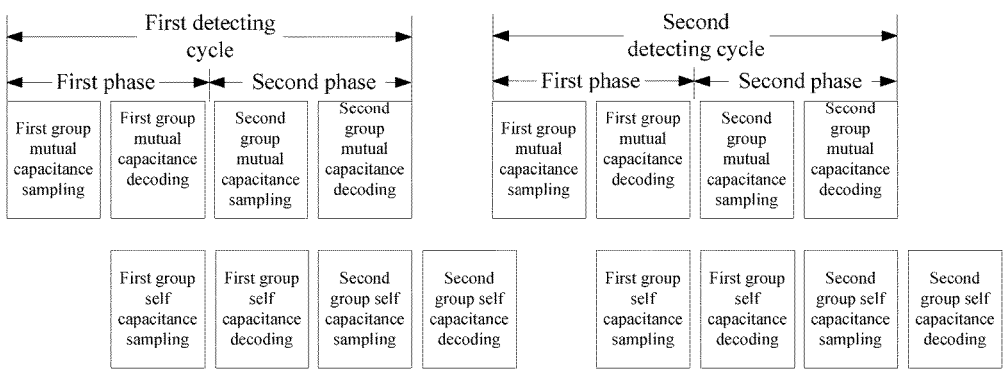
FIG. 7 is the schematic diagram of the alternative detections in the mutual capacitance mode and the self capacitance mode.

As shown in FIG. 7, the driving means and sensing means in the self capacitance mode and the mutual capacitance mode are evenly divided into a plurality of groups to scan and detect the rows and columns of the capacitance array of the touch sensor, and the both implement collection alternatively in the groups. Because in the mutual capacitance mode it needs certain time to implement decoding after each one group has been sampled, and the sampling in the self capacitance mode is implemented in the decoding time interval. When one group has been sampled and is being decoded in the mutual capacitance mode, one group is sampled in the self capacitance mode; when one group has been sampled and is being decoded in the self capacitance mode, another group is sampled in the mutual capacitance mode, and the two steps is implemented alternatively, to reduce the sampling time in the self capacitance mode.

Step S102: determining a multi-touch in the mutual capacitance mode.

In this step, determining a multi-touch in the mutual capacitance mode comprises two situations: one is the normal multi-touch, i.e. the user implements the touch using two or more than two fingers; the other is the multi-touch determined under the condition that the press is executed by one finger with large area (for example the point-split caused by the press executed by the thumb). More subsequent steps are needed to judge whether the multi-touch is the normal multi-touch or the misjudged multi-touch.

Step S103: implementing envelopment analysis for data obtained by sampling in the self capacitance mode.

In this step and the subsequent steps the envelopment analysis are needed in the self capacitance mode to judge whether the touch state in the self capacitance is the single touch or the multi-touch.

Step S104: judging whether the number of the envelope is one, if yes, going to step S105, else going to step S106.

Figure 8:
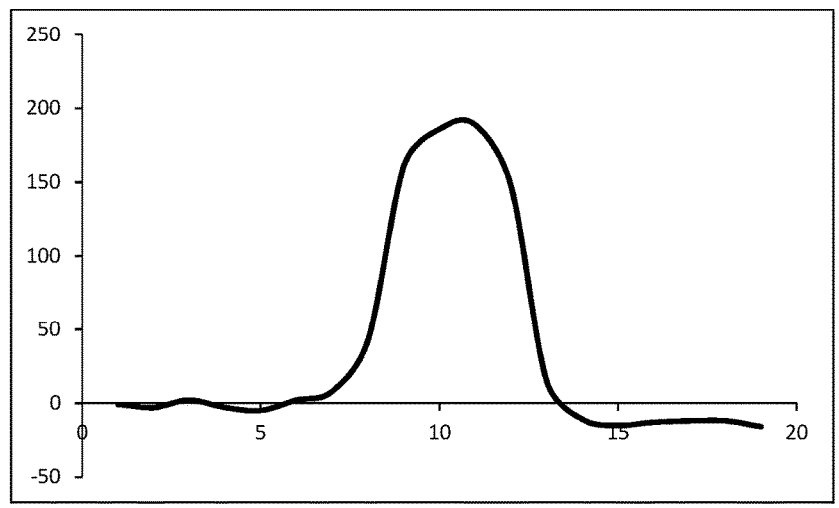
FIG. 8 is the envelope diagram of the data obtained by sampling in the self capacitance mode when the single touch is executed in the floating state.
Figure 9:
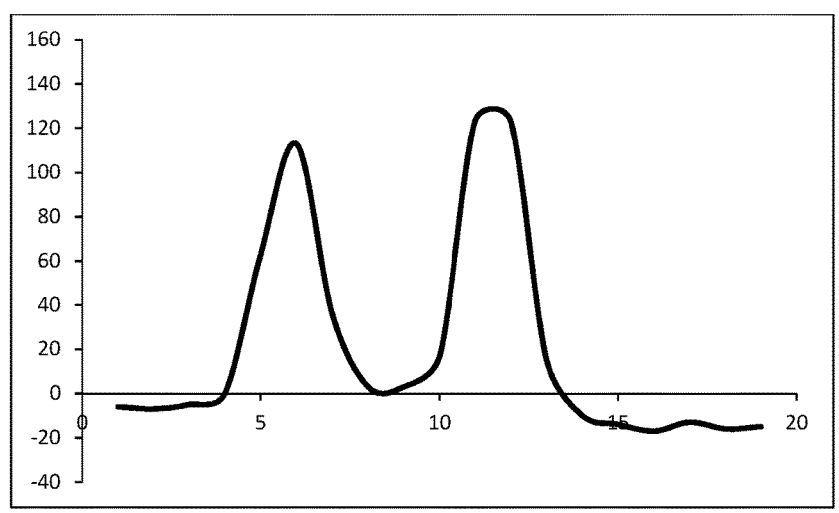
FIG. 9 is the envelope diagram of the data obtained by sampling in the self capacitance mode when the multi-touch is executed in the floating state.
Figure 10:
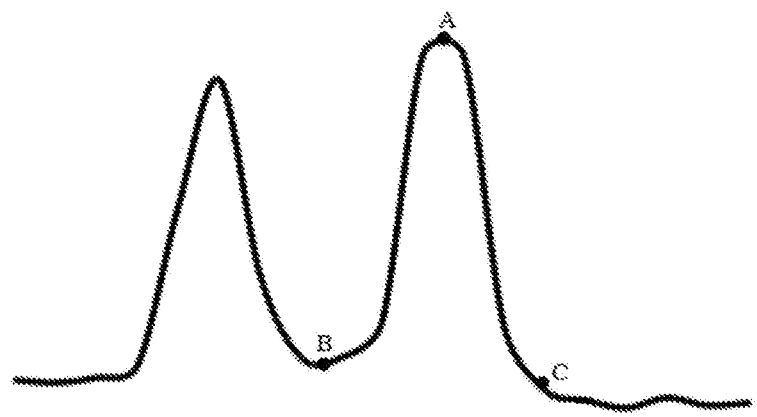
FIG. 10 is the schematic diagram of the envelopment analysis in the self capacitance mode in the embodiment one of the present disclosure.

This step is to judge whether the number of the envelope is one or more than one. If one envelope exists, that the touch state in the mutual capacitance mode is the single touch is determined and the method goes to step S105; else that the touch state in the mutual capacitance mode is the multi-touch is determined and the method goes to step S106. FIG. 8 shows the envelope diagram of the data obtained by sampling in the self capacitance mode when the single touch is executed in the floating state, the data obtained by sampling in the self capacitance mode when the single touch is executed show single envelope; FIG. 9 shows the envelope diagram of the data obtained by sampling in the self capacitance mode when the multi-touch is executed in the floating state, the data obtained by sampling in the self capacitance mode when the multi-touch is executed show a plurality of envelopes. In the FIG. 8 and FIG. 9, the X-coordinates indicate the orders of the driving lines, and the Y-coordinates indicate the values of the variations in the detection signal. Specifically, the envelopment analysis may be implemented through the following steps:

A1: searching a point (point A in FIG. 10) indicating a maximum value of signal variations;

Wherein the values of the signal variations means the differences between the detected capacitances and the reference values, the reference values are the values of the original detection data sampled by the capacitive touch screen driving IC under the conditions of without any electromagnetic interference, stable environment temperature and humidity, and the reference values are unsigned.

A2: judging whether the searched maximum value of the signal variations is larger than a preset first threshold;

Wherein, the first threshold is set during the design procedure according to the actual debugging results, and can't be changed after the setting.

A3: determining the envelope exists and needing to dividing the envelope if the searched maximum value of signal variations is larger than a preset first threshold;

A4: searching leftward and rightward from the point (point A in FIG. 10) indicating the maximum value of the signal variations to find boundaries (points B and C in FIG. 10) of the envelope and obtain an envelope region;

A5: judging whether another point whose value is larger than the first threshold exists outside the envelope region;

Because it only needs to determine whether one envelope or a plurality of envelopes exist, and doesn't need to determine the specific quantity of the envelopes, it only needs to judge whether another point whose value is larger than the first threshold exists outside the envelope region in this step.

A6: if no point whose value is larger than the first threshold exists outside the envelope region, determining one envelope exists; else determining more than one envelopes exist.

If no point whose value is larger than the first threshold, except point A, is found in step A5, it means that only one envelope exists, and actually only one touch point exists, then step S105 is implemented to combine points; else it means that actually more than one touch points exist, and the points don't need to be combined, and step S106 is implemented.

Step S105: determining single touch, and outputting one touch coordinate.

In this step, the data detected from the mutual capacitance are combined into one touch point, and one touch coordinate is output, such that the purpose of inhibiting the floating effect in the mutual detection is achieved.

Step S106: determining multi-touch, and outputting one touch coordinate.

This step is implemented according to the ordinary touch working process, and a plurality of touch coordinates are output.

Through the alternative detections in the self capacitance mode and the mutual capacitance mode, after the sampling in one capacitance mode has finished the decoding time interval in that capacitance mode is also used for another sampling in the other capacitance mode, for example, the time interval for decoding in the mutual capacitance mode is also used for sampling in the self capacitance mode, or the time interval for decoding in the self capacitance mode is also used for sampling in the mutual, thereby reducing the time for sampling in the self capacitance mode, utilizing the time of detection reasonably and effectively and improving work efficiency; meanwhile using the detection properties in the self capacitance mode, the present disclosure improves the accuracy of the touch detection result of the touch sensor, particularly the accuracy of the detection result for distinguishing whether the touch is the single touch or the multi-touch in the case that the touch terminal is subjected to a large area touch in the floating state, such that the problem of point-split is solved and the user experience is improved.

Embodiment Two

Figure 11:
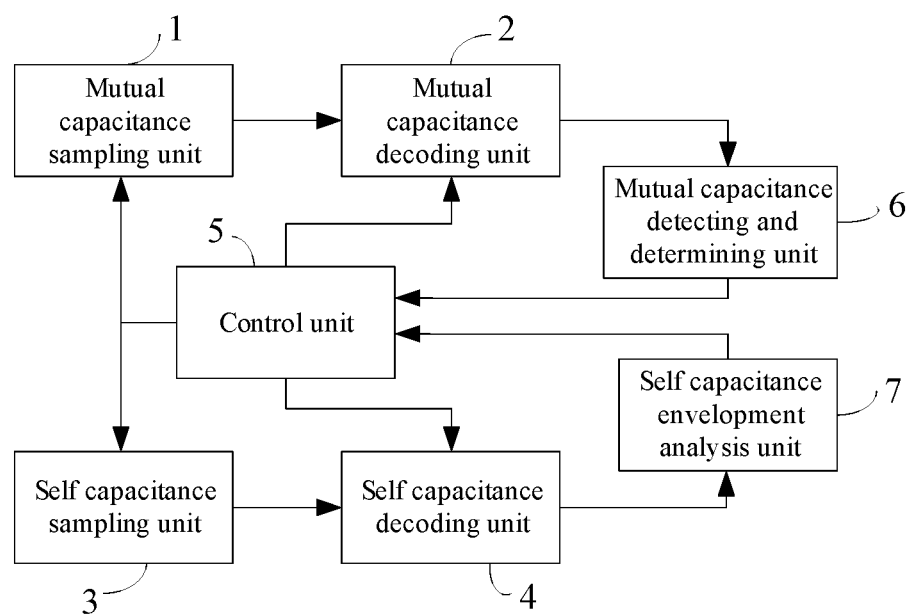
FIG. 11 is a block diagram of a touch detecting system for a touch sensor in the embodiment two and embodiment four of the present disclosure.

FIG. 11 is a block diagram of a touch detecting system for a touch sensor in the embodiment two of the present disclosure; by using the detection properties in the self capacitance mode, this embodiment solves the problem of point-split in the floating state in the mutual capacitance mode, therefore the user experience is improved.

In this embodiment, a touch detecting system for a touch sensor comprises a mutual capacitance sampling unit 1, a mutual capacitance decoding unit 2, a self capacitance sampling unit 3, self capacitance decoding unit 4, a control unit 5, a mutual capacitance detecting and determining unit 6 and a self capacitance envelopment analysis unit 7. The mutual capacitance sampling unit 1 are respectively coupled to the mutual capacitance decoding unit 2 and the control unit 5 and is configured to sample a mutual capacitance signal; the mutual capacitance decoding unit 2 are respectively coupled to the mutual capacitance sampling unit 1 and the control unit 5 and is configured to decode the mutual capacitance signal; the self capacitance sampling unit 3 is respectively coupled to the self capacitance decoding unit 4 and the control unit 5 and is configured to sample a self capacitance signal; the self capacitance decoding unit 4 is respectively coupled to the self capacitance sampling unit 3 and the control unit 5 and is configured to decode the self capacitance signal; the control unit 5 is respectively coupled to the mutual capacitance sampling unit 1, mutual capacitance decoding unit 2, self capacitance sampling unit 3 and self capacitance decoding unit 4 and is configured to control the alternative detections in the mutual capacitance mode and the self capacitance mode; the mutual capacitance detecting and determining unit 6 is coupled to the mutual capacitance decoding unit 2 and the control unit 5 respectively and is configured to preliminarily judge whether a touch state is a multi-touch according to a scanning and detecting result in the mutual capacitance mode and send a first signal to the control unit 5 when the touch state is judged as the multi-touch; the self capacitance envelopment analysis unit 7 is coupled to the self capacitance decoding unit 4 and the control unit 5 respectively and is configured to judge whether the touch state is a single touch or the multi-touch in the mutual capacitance mode and send a second signal to the control unit when the touch condition is judged as the single touch; the control unit 5 is further coupled to the mutual capacitance detecting and determining unit 6 and the self capacitance envelopment analysis unit 7 respectively, and is configured to control the self capacitance envelopment analysis unit 7 to work when receiving the first signal sent by mutual capacitance detecting and determining unit 6 and output a touch coordinate when receiving the second signal sent by the self capacitance envelopment analysis unit 7.

The method of embodiment one may be applied to the system in this embodiment, through the alternative detections in the self capacitance mode and the mutual capacitance mode, the time for sampling in the self capacitance mode is reduced, the time for detecting is reasonably and effectively used, and the work efficiency is improved; meanwhile using the detection properties in the self capacitance mode the accuracy of the touch detection result of the touch sensor, particularly the accuracy of the detection result for distinguishing whether the touch is the single touch or the multi-touch in the case that the touch terminal is subjected to a large area touch in the floating state, is improved, such that the problem of point-split in the floating state in the mutual capacitance mode is solved and the user experience is improved.

Embodiment Three

Figure 12:
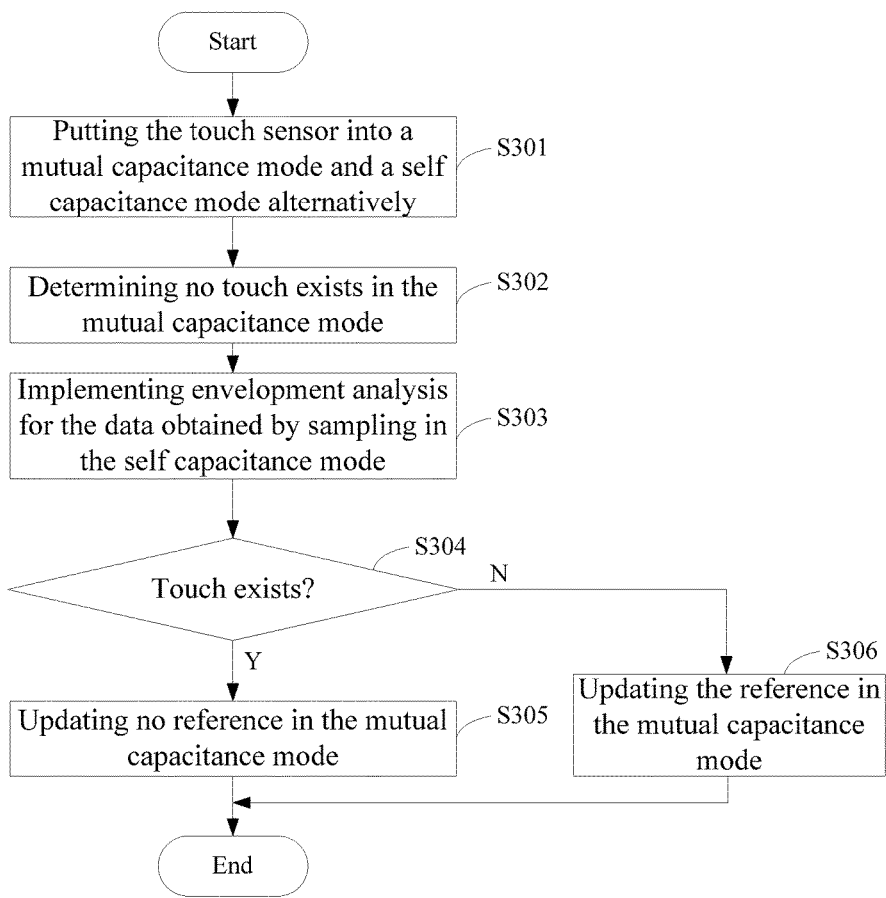
FIG. 12 is a flow chart of a touch detecting method for a touch sensor in the embodiment three of the present disclosure.

Referring to FIG. 12, a flow chart of a touch detecting method for a touch sensor in the embodiment three of the present disclosure is shown. By using the detection properties in the self capacitance mode, this embodiment solves the problem that the reference is updated incorrectly when point-cancellation appears in the floating state in the mutual capacitance mode. The detecting method comprises the following steps:

Step S301: putting the touch sensor into a mutual capacitance mode and a self capacitance mode alternatively.

As shown in FIG. 7, the driving means and sensing means are evenly divided into a plurality of groups in the self capacitance mode and the mutual capacitance mode to scan and detect the rows and columns of the capacitance array of the touch sensor, and the both implement collection alternatively. Because in the mutual capacitance mode it needs certain time to implement decoding after each one group has been sampled, and the sampling in the self capacitance mode is implemented in the decoding time interval. When one group has been sampled and is being decoded in the mutual capacitance mode, one group is sampled in the self capacitance mode; when one group has been sampled and is being decoded in the self capacitance mode, another group is sampled in the mutual capacitance mode, and the two steps are implemented alternatively, to reduce the sampling time in the self capacitance mode.

Step S302: determining no touch exists in the mutual capacitance mode.

Figure 13:
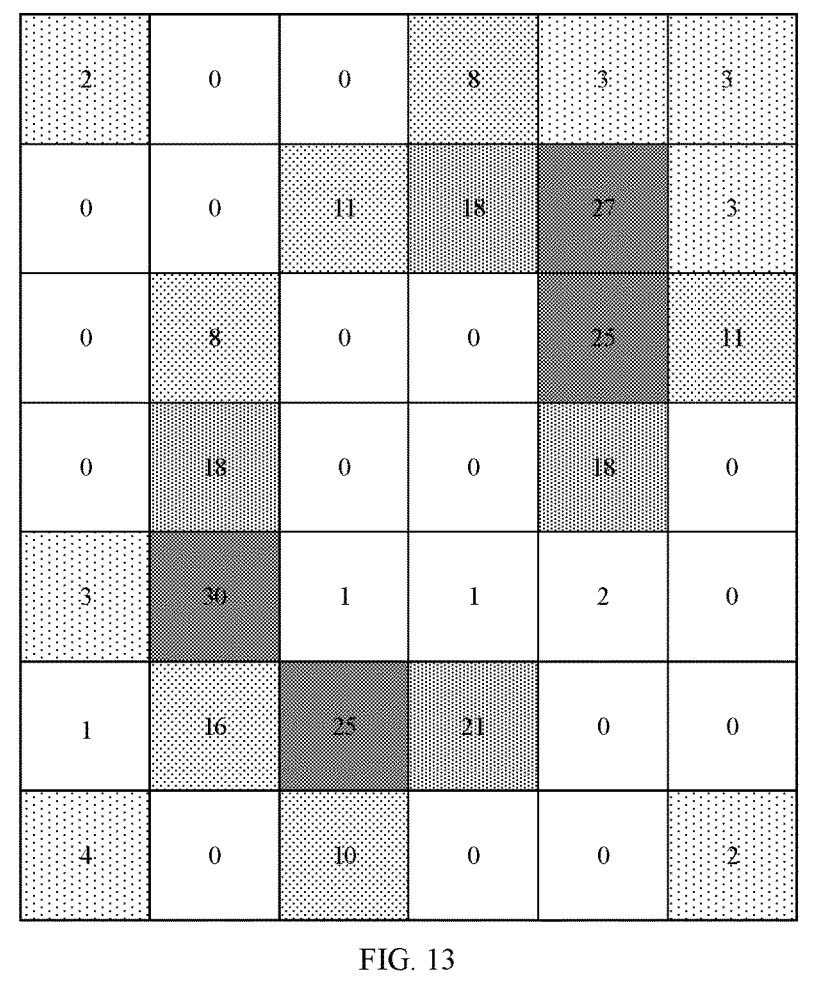

As shown in FIG. 13, in the floating state, a large area of the capacitive touch screen is pressed, due to the signal cancellation, the data can't reach the reset threshold, and the touch state is judged as no touch according the scanning and detecting result in the self capacitance mode, and the reference is updated incorrectly, which causes a point-emergence (the incorrect detection that the touch point appears although no touch is executed) when the finger leaves the touch screen. Because the floating has very little affect on the self capacitance mode, even the phenomenon of point-cancellation appears in mutual capacitance mode, and the touch can be accurately detected in the capacitance mode. In this embodiment, whether the touch exists is determined through the envelopment analysis in self capacitance mode in the subsequent steps.

Step S303: implementing envelopment analysis for data obtained by sampling in the self capacitance mode.

In this step and the subsequent steps, the envelopment analysis in the self capacitance mode is used to judge whether the touch status is the single touch or the multi-touch.

Step S304: judging whether the touch exists, if yes, going to step S305, else going to step S306.

In this step, whether touch exists in the mutual capacitance mode is judged in the self capacitance mode. If the touch exists, going to step S305: updating no reference in the mutual capacitance mode; else determining no touch exists and going to step S306: updating the reference in the mutual capacitance mode. Specifically, the envelopment analysis may be implemented through the following steps:

A1: searching a point (point A in FIG. 10) indicating a maximum value of signal variations;

Wherein the values of the signal variations means the differences between the detected capacitances and the reference values, the reference values are the values of the original detection data sampled by the capacitive touch screen driving IC under the conditions of without any electromagnetic interference, stable environment temperature and humidity, and the reference values are unsigned.

A2: judging whether the searched maximum value of the signal variations is larger than a preset first threshold;

Wherein, the first threshold is set during the design procedure according to the actual debugging results, and can't be changed after the setting.

A3: determining the envelope exists and needing to dividing the envelope if the searched maximum value of signal variations is larger than a preset first threshold;

S305: updating no reference in the mutual capacitance mode.

When it is determined that the touch exists through the detection in the self capacitance mode, the reference isn't updated provisionally, to avoid updating the reference incorrectly when the point-cancellation appears in the floating state in the self capacitance.

Step S306: updating the reference in the mutual capacitance mode.

When it is determined that no touch exists through the detection in the self capacitance mode, the reference may be updated in the mutual capacitance mode.

Through the alternative detections in the self capacitance mode and the mutual capacitance mode, after the sampling in one capacitance mode has finished, the decoding time interval in that capacitance mode is also used for another sampling in the other capacitance mode, for example, the time interval for decoding in the mutual capacitance mode is also used for sampling in the self capacitance mode, or the time interval for decoding in the self capacitance mode is also used for sampling in the mutual, thereby reducing the time used for sampling in the self capacitance mode, utilizing the time of detection reasonably and effectively and improving work efficiency; meanwhile using the detection properties in the self capacitance mode, the problem that the reference is updated incorrectly when the point-cancellation appears in the floating state in the self capacitance mode, and the accuracy of a touch detection result of the touch sensor is improved.

Embodiment Four

Referring to FIG. 11, a block diagram of a touch detecting system for a touch sensor in the embodiment four of the present disclosure is shown; by using the detection properties in the self capacitance mode, this embodiment solves the problem that the reference is updated incorrectly when point-cancellation appears in the floating state in the mutual capacitance mode.

In this embodiment, a touch detecting system for a touch sensor comprises a mutual capacitance sampling unit 1, a mutual capacitance decoding unit 2, a self capacitance sampling unit 3, self capacitance decoding unit 4, a control unit 5, a mutual capacitance detecting and determining unit 6 and a self capacitance envelopment analysis unit 7. The mutual capacitance sampling unit 1 are respectively coupled to the mutual capacitance decoding unit 2 and the control unit 5 and is configured to sample a mutual capacitance signal; the mutual capacitance decoding unit 2 are respectively coupled to the mutual capacitance sampling unit 1 and the control unit 5 and is configured to decode the mutual capacitance signal; the self capacitance sampling unit 3 is respectively coupled to the self capacitance decoding unit 4 and the control unit 5 and is configured to sample a self capacitance signal; the self capacitance decoding unit 4 is respectively coupled to the self capacitance sampling unit 3 and the control unit 5 and is configured to decode the self capacitance signal; the control unit 5 is respectively coupled to the mutual capacitance sampling unit 1, mutual capacitance decoding unit 2, self capacitance sampling unit 3 and self capacitance decoding unit 4 and is configured to control the alternative detections in the mutual capacitance mode and the self capacitance mode; the mutual capacitance detecting and determining unit 6 is respectively coupled to the mutual capacitance decoding unit 2 and the control unit 5 and is configured to judge whether a touch exists according to a scanning result in the mutual capacitance mode and send a third signal to the control unit 5 when no touch exists is determined; the self capacitance envelopment analysis unit 7 is coupled to the self capacitance decoding unit 4 and the control unit 5 respectively, and is configured to judge whether the touch exists in the mutual capacitance mode and send a fourth signal to the control unit when the touch exists is determined; the control unit 5 is further coupled to the mutual capacitance detecting and determining unit 6 and the self capacitance envelopment analysis unit 7 respectively, and is configured to control the self capacitance envelopment analysis unit 7 to work when receiving the third single sent by the mutual capacitance detecting and determining unit 6 and updating no reference in the mutual capacitance mode when receiving the fourth signal sent by the self capacitance envelopment analysis unit 7.

The method of the embodiment three may be applied to the system in this embodiment, through the alternative detections in the self capacitance mode and the mutual capacitance mode, the time for sampling in the self capacitance mode is reduced, the time for detecting is reasonably and effectively used, and the work efficiency is improved; meanwhile using the detection properties in the self capacitance mode, the problem that the reference is updated incorrectly when point-cancellation appears in the floating state in the mutual capacitance mode, such that the accuracy of the touch detection result of the touch sensor is improved.

Embodiment Five

Figure 14:
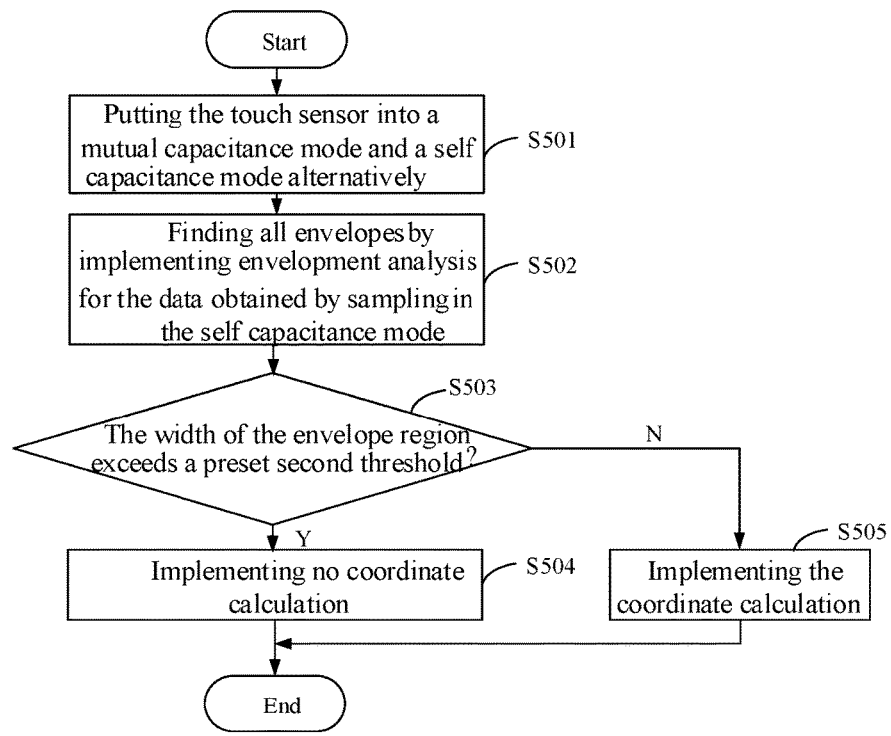
FIG. 14 is a flow chart of a touch detecting method for a touch sensor in the embodiment five of the present disclosure.

Referring to FIG. 14, a flow chart of a touch detecting method for a touch sensor in the embodiment 5 of the present disclosure is shown. In this embodiment, the detection properties in the self capacitance mode is used for a palm inhibition, the palm inhibition refers to an accuracy identification of the palm touch and the finger touch for the capacitance screen application with large size, to eliminate the touch point caused by the palm without affecting the operation of the finger, thereby avoiding a palm interference. The detecting method comprises the following steps:

Step S501: putting the touch sensor into a mutual capacitance mode and a self capacitance mode alternatively.

As shown in FIG. 7, the driving means and sensing means in the self capacitance mode and the mutual capacitance mode are evenly divided into a plurality of groups to scan and detect the rows and columns of the capacitance array of the touch sensor, and the both implement collection alternatively in the groups. Because in the mutual capacitance mode it needs certain time to implement decoding after each one group has been sampled, and the sampling in the self capacitance mode is implemented in the decoding time interval. When one group has been sampled and is being decoded in the mutual capacitance mode, one group is sampled in the self capacitance mode; when one group has been sampled and is being decoded in the self capacitance mode, another group is sampled in the mutual capacitance mode, and the two steps are implemented alternatively, to reduce the sampling time in the self capacitance mode.

Step S502: finding all envelopes by implementing envelopment analysis for data obtained by sampling in the self capacitance mode.

Specifically, the envelopment analysis may be implemented through the following steps:

A1: searching a point (point A in FIG. 10) indicating a maximum value of signal variations;

Wherein the values of the signal variations means the differences between the detected capacitances and the reference values, the reference values are the values of the original detection data sampled by the capacitive touch screen driving IC under the conditions of without any electromagnetic interference, stable environment temperature and humidity, and the reference values are unsigned.

A2: judging whether the searched maximum value of the signal variations is larger than a preset first threshold;

Wherein, the first threshold is set during the design procedure according to the actual debugging results, and can't be changed after the setting.

A3: determining the envelope exists and needing to dividing the envelope if the searched maximum value of signal variations is larger than a preset first threshold;

A4: searching leftward and rightward from the point (point A in FIG. 10) indicating the maximum value of the signal variations to find boundaries (points B and C in FIG. 10) of the envelope and obtain an envelope region.

Step S503: judging whether the width of the envelope region exceeds a preset second threshold, if yes, going to step S504, else ending the process of this embodiment.

In this step, if the width of the envelope region exceeds the preset second threshold, it means that the touch to corresponding the envelope is a hand touch, then step S504 is implemented and no coordinate calculation is implemented for the region corresponding to the data obtained by sampling in the mutual capacitance mode; else step S505 is implemented, the coordinate calculation is implemented for the region corresponding to the data obtained by sampling in the mutual capacitance mode. Wherein, the second threshold is set during the design procedure according to the actual debugging results, and can't be changed after the setting.

Step S504: implementing no coordinate calculation.

In this step, if the touch is the palm touch, the region corresponding to the data obtained by sampling in the mutual capacitance mode is illegal, and no coordinate calculation is implemented for the region corresponding to the data obtained by sampling in the mutual capacitance mode.

Step S505: implementing the coordinate calculation.

This step is implemented according to the ordinary touch working process, and the coordinate calculation is implemented.

Through the alternative detections in the self capacitance mode and the mutual capacitance mode, after the sampling in one capacitance mode has finished the decoding time interval in that capacitance mode is also used for another sampling in the other capacitance mode, for example, the time interval for decoding in the mutual capacitance mode is also used for sampling in the self capacitance mode, or the time interval for decoding in the self capacitance mode is also used for sampling in the mutual, thereby reducing the time for sampling in the self capacitance mode, utilizing the time of detection reasonably and effectively and improving work efficiency; meanwhile using the detection properties in the self capacitance mode, the touch point caused by the palm is eliminated without affecting the operation of the finger, such that the accuracy of a touch detection result of the touch sensor is improved.

Embodiment Six

Figure 15:
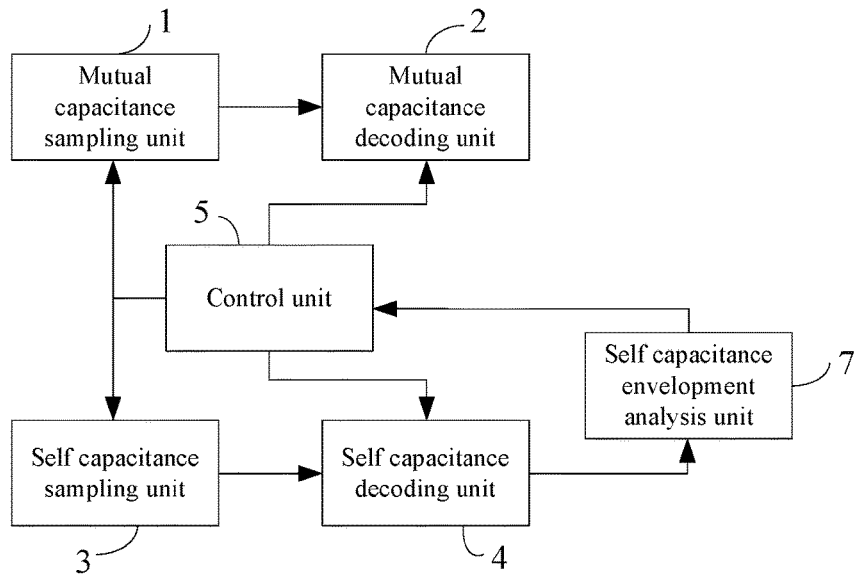
FIG. 15 is a block diagram of a touch detecting system for a touch sensor in the embodiment six of the present disclosure.

Referring to FIG. 15, a block diagram of a touch detecting system for a touch sensor in the embodiment six of the present disclosure is shown. In this embodiment, the detection properties in the self capacitance mode is used for a palm inhibition, therefore the touch point caused by the palm is eliminated without affecting the operation of the finger.

In this embodiment, a touch detecting system for a touch sensor comprises a mutual capacitance sampling unit 1, a mutual capacitance decoding unit 2, a self capacitance sampling unit 3, self capacitance decoding unit 4, a control unit 5, and a self capacitance envelopment analysis unit 7. The mutual capacitance sampling unit 1 are respectively coupled to the mutual capacitance decoding unit 2 and the control unit 5 and is configured to sample a mutual capacitance signal; the mutual capacitance decoding unit 2 are respectively coupled to the mutual capacitance sampling unit 1 and the control unit 5 and is configured to decode the mutual capacitance signal; the self capacitance sampling unit 3 is respectively coupled to the self capacitance decoding unit 4 and the control unit 5 and is configured to sample a self capacitance signal; the self capacitance decoding unit 4 is respectively coupled to the self capacitance sampling unit 3 and the control unit 5 and is configured to decode the self capacitance signal; the control unit 5 is respectively coupled to the mutual capacitance sampling unit 1, mutual capacitance decoding unit 2, self capacitance sampling unit 3 and self capacitance decoding unit 4 and is configured to control the alternative detections in the mutual capacitance mode and the self capacitance mode; the self capacitance envelopment analysis unit 7 is coupled to the self capacitance decoding unit 4 and the control unit 5 respectively, and is configured to find all envelopes and judge whether a width of an envelope region exceeds a preset second threshold, if the width of the envelope region exceeds the preset second threshold, determine a touch corresponding to the envelope is a hand touch and a region corresponding to the data obtained by sampling in the mutual capacitance mode is illegal, and send a fifth signal to the control unit 5; the control unit 5 is further coupled to the self capacitance envelopment analysis unit 7, and is configured to implement no coordinate calculation for the region corresponding to the data obtained by sampling in the mutual capacitance mode when receiving the fifth signal sent by the self capacitance envelopment analysis unit 7.

The method of embodiment five may be applied to the system in this embodiment, through the alternative detections in the self capacitance mode and the mutual capacitance mode, the time for sampling in the self capacitance mode is reduced, the time of detection is utilized reasonably and effectively and the work efficiency is improved; meanwhile using the detection properties in the self capacitance mode the touch point caused by the palm is eliminated without affecting the operation of the finger, such that the accuracy of a touch detection result of the touch sensor is improved.

Embodiment Seven

Figure 16:
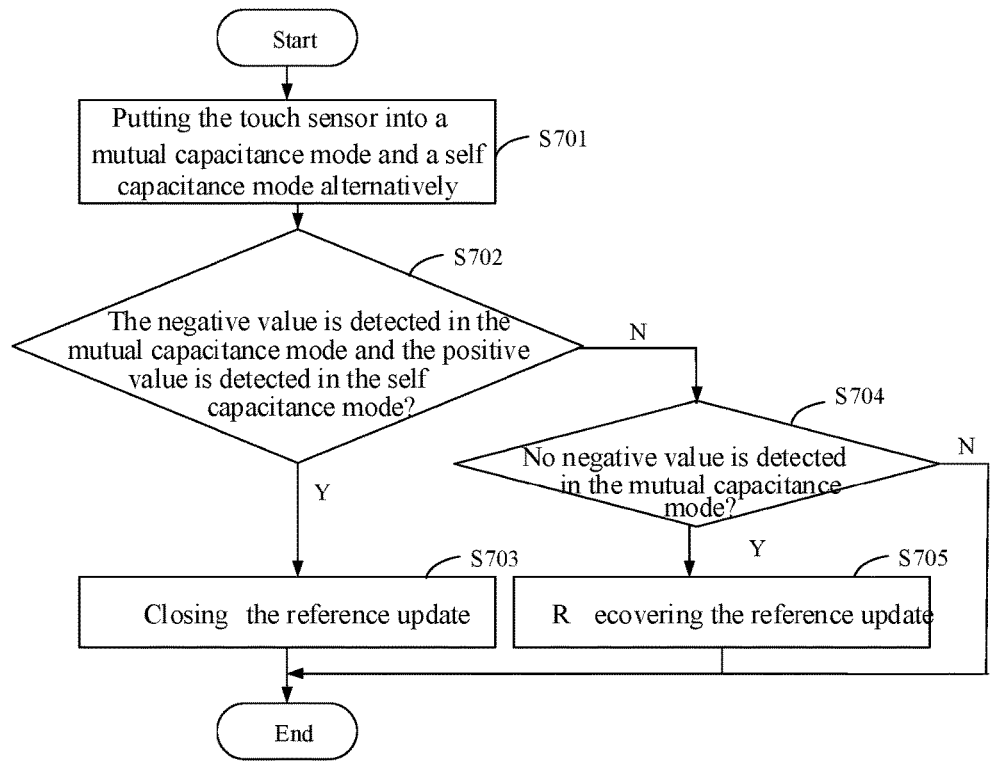
FIG. 16 is a flow chart of a touch detecting method for a touch sensor in the embodiment seven of the present disclosure.

Referring to FIG. 16, a flow chart of a touch detecting method for an anti-interference touch sensor in the embodiment 7 of the present disclosure is shown. In this embodiment, the detection properties in the self capacitance mode are used to prevent the water interference. The properties of the mutual capacitance detection technology makes it vulnerable to the interference of water film, water droplets, sweat, etc, this kind of interference will lead to a reference error, and the phenomenon of point-emergence comes out. The detecting method comprises the following steps:

Step S701: putting the touch sensor into a mutual capacitance mode and a self capacitance mode alternatively.

As shown in FIG. 7, the driving means and sensing means in the self capacitance mode and the mutual capacitance mode are evenly divided into a plurality of groups to scan and detect the rows and columns of the capacitance array of the touch sensor, and the both implement collection alternatively in the groups. Because in the mutual capacitance mode it needs certain time to implement decoding after each one group has been sampled, and the sampling in the self capacitance mode is implemented in the decoding time interval. When one group has been sampled and is being decoded in the mutual capacitance mode, one group is sampled in the self capacitance mode; when one group has been sampled and is being decoded in the self capacitance mode, another group is sampled in the mutual capacitance mode, and the two steps is implemented alternatively, to reduce the sampling time in the self capacitance mode.

Step S702: judging whether a negative value is detected in the mutual capacitance mode and a positive value is detected in the self capacitance mode, if yes, going to step S703, else going to the step S704.

Step S703: closing a reference update.

When only the water is on the screen, the negative value will be detected in the mutual capacitance mode and the positive value will be detected in the self capacitance mode, a water-existing state may be entered, and the reference update is closed.

The process of this embodiment is ended after step S703.

Step S704: judging whether no negative value is detected in the mutual capacitance mode, if yes, going to step S705, else ending the process of this embodiment.

Step S705: recovering the reference update.

When no negative value is detected in the mutual capacitance mode, it means no water on the screen, the water-existing state may be quit and the reference update is recovered.

Through the alternative detections in the self capacitance mode and the mutual capacitance mode, after the sampling in one capacitance mode has finished the decoding time interval in that capacitance mode is also used for another sampling in the other capacitance mode, for example, the time interval for decoding in the mutual capacitance mode is also used for sampling in the self capacitance mode, or the time interval for decoding in the self capacitance mode is also used for sampling in the mutual, thereby reducing the time for sampling in the self capacitance mode, utilizing the time of detection reasonably and effectively and improving work efficiency; meanwhile the detection properties in the self capacitance mode is used to prevent the water interference, the accuracy of a touch detection result of the touch sensor is improved.

Embodiment Eight

Figure 17:
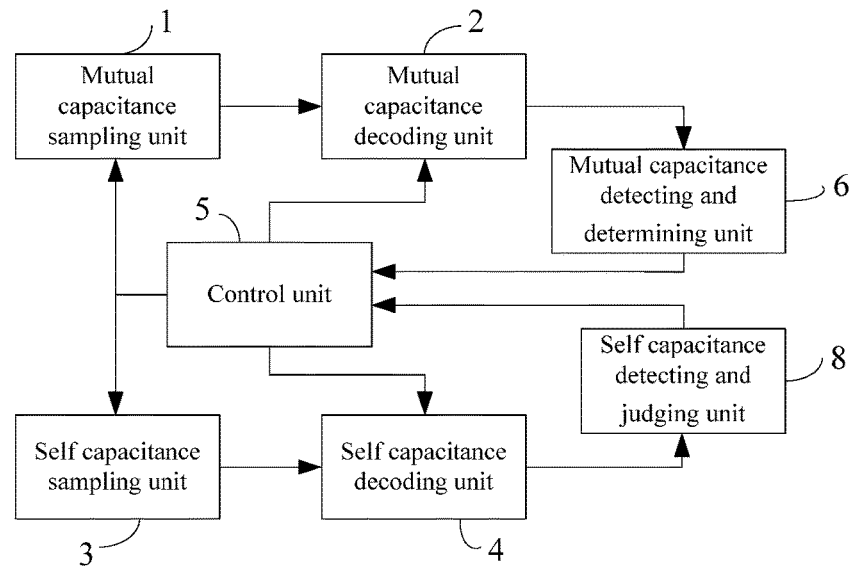
FIG. 17 is a block diagram of a touch detecting system for a touch sensor in the embodiment eight of the present disclosure.

Referring to FIG. 17, a block diagram of a touch detecting system for a touch sensor in the embodiment eight of the present disclosure is shown. In this embodiment, the detection properties in the self capacitance mode are used to prevent the water interference.

In this embodiment, a touch detecting system for a touch sensor comprises a mutual capacitance sampling unit 1, a mutual capacitance decoding unit 2, a self capacitance sampling unit 3, self capacitance decoding unit 4, a control unit 5, a mutual capacitance detecting and determining unit 6 and a self capacitance detecting and determining unit 7. The mutual capacitance sampling unit 1 are respectively coupled to the mutual capacitance decoding unit 2 and the control unit 5 and is configured to sample a mutual capacitance signal; the mutual capacitance decoding unit 2 are respectively coupled to the mutual capacitance sampling unit 1 and the control unit 5 and is configured to decode the mutual capacitance signal; the self capacitance sampling unit 3 is respectively coupled to the self capacitance decoding unit 4 and the control unit 5 and is configured to sample a self capacitance signal; the self capacitance decoding unit 4 is respectively coupled to the self capacitance sampling unit 3 and the control unit 5 and is configured to decode the self capacitance signal; the control unit 5 is respectively coupled to the mutual capacitance sampling unit 1, mutual capacitance decoding unit 2, self capacitance sampling unit 3 and self capacitance decoding unit 4 and is configured to control the alternative detections in the mutual capacitance mode and the self capacitance mode; the mutual capacitance detecting and determining unit 6 is respectively coupled to the mutual capacitance decoding unit 2 and the control unit 5 and is configured to configured to send a sixth signal to the control unit 5 when a negative value is detected in the mutual capacitance mode and send a seventh signal to the control unit 5 when no negative value is detected in the mutual capacitance mode; the self capacitance envelopment analysis unit 8 is coupled to the mutual capacitance decoding unit 4 and the control unit 5 respectively, and configured to send a eighth signal to the control unit 5 when a positive value is detected in the mutual capacitance mode; the control unit 5 is further coupled to the mutual capacitance detecting and determining unit 6 and the self capacitance envelopment analysis unit 8 respectively, and is configured to close a reference update when receiving the sixth single sent by the mutual capacitance detecting and determining unit 6 and the eight signal sent by the self capacitance detecting and determining unit 8, and to recover the reference update when receiving the seventh signal sent by the mutual capacitance detecting and determining unit 6.

The method of embodiment seven may be applied to the system in this embodiment, through the alternative detections in the self capacitance mode and the mutual capacitance mode, the time for sampling in the self capacitance mode is reduced, the time of detection is utilized reasonably and effectively and the work efficiency is improved; meanwhile the detection properties in the self capacitance mode is used to prevent the water interference, the accuracy of a touch detection result of the touch sensor is improved.

Embodiment Nine

In this embodiment, a touch terminal, the touch terminal comprises the touch detecting system for a touch sensor of embodiment two, embodiment four, embodiment six or embodiment eight, to achieve the functions of inhibiting the point-split, avoiding updating the reference incorrectly when the point-cancellation appears in the floating state in the self capacitance, palm-inhibition or preventing the water interference, such that the accuracy of a touch detection result of the touch sensor is improved. Alternatively, the touch terminal may comprise any two or more touch detecting systems for a touch sensor of embodiment two, embodiment four, embodiment six and embodiment eight, to combine the above mentioned functions, for example the touch detecting systems of the four embodiments are combined to achieve all the functions of inhibiting the point-split, avoiding updating the reference incorrectly when the point-cancellation appears in the floating state in the self capacitance, palm-inhibition and preventing the water interference.

What described above are only preferred embodiments of the present disclosure but are not intended to limit the scope of the present disclosure, any modifications, equivalent replacements and improvements etc. Made within the spirit and principle of the present disclosure, should be included in the protection scope of the present disclosure.

What is claimed is:

1. A touch detecting method for a touch sensor, wherein the method comprises the following steps:
    putting the touch sensor into a mutual capacitance mode and a self capacitance mode alternatively, and scanning and detecting the rows and columns of a capacitance array of the touch sensor;
    when a touch state is preliminarily judged as no touch according to a scanning and detecting result in the mutual capacitance mode, implementing envelopment analysis for data obtained by sampling in the self capacitance mode and determining whether the touch exists in the mutual capacitance mode; and
    not updating reference in the mutual capacitance mode if the touch exists, or
    updating the reference in the mutual capacitance mode if no touch exists.

2. The method according to claim 1, wherein the step of implementing envelopment analysis for data obtained by sampling in the self capacitance mode and determining whether the touch exists in the mutual capacitance mode comprises steps:
    searching a point indicating a maximum value of signal variations;
    judging whether the searched maximum value of the signal variations is larger than a preset first threshold; and
    determining the touch exists if the searched maximum value of signal variations is larger than a preset first threshold; otherwise, determining no touch exists.

3. A touch detecting method for a touch sensor, wherein the method comprises the following steps:
    putting the touch sensor into a mutual capacitance mode and a self capacitance mode alternatively, and scanning and detecting the rows and columns of a capacitance array of the touch sensor;
    finding all envelopes by implementing envelopment analysis for data obtained by sampling in the self capacitance mode;
    judging whether a width of a region of one of the envelopes exceeds a preset second threshold;
    if the width of the region exceeds the preset second threshold, determining a touch corresponding to the envelope is a hand touch and the region corresponding to the data obtained by sampling in the mutual capacitance mode is illegal, and implementing no coordinate calculation for the region corresponding to the data obtained by sampling in the mutual capacitance mode; or
    otherwise, determining the touch corresponding to the envelope is a finger touch and the region corresponding to the data obtained by sampling in the mutual capacitance mode is legal, and implementing a coordinate calculation for the region corresponding to the data obtained by sampling in the mutual capacitance mode.

4. The method according to claim 3, wherein the step of finding all envelopes by implementing envelopment analysis for data obtained by sampling in the self capacitance mode comprises steps:
    searching a point indicating a maximum value of signal variations;
    judging whether the searched maximum value of the signal variations is larger than a preset first threshold;
    determining the envelope exists if the searched maximum value of signal variations is larger than a preset first threshold; and
    searching leftward and rightward from the point indicating the maximum value of the signal variations to find a boundary of the envelope and obtain an envelope region.

5. A touch detecting method for a touch sensor, wherein the method comprises the following steps:
    putting the touch sensor into a mutual capacitance mode and a self capacitance mode alternatively, and scanning and detecting the rows and columns of a capacitance array of the touch sensor;
    closing a reference update when a negative value is detected in the mutual capacitance mode and a positive value is detected in the self capacitance mode; and
    recovering the reference update when no negative value is detected in the mutual capacitance mode.

6. A touch detecting system for a touch sensor, wherein the system comprises:
    a mutual capacitance sampling unit, coupled to a mutual capacitance decoding unit and a control unit and configured to sample a mutual capacitance signal the mutual capacitance decoding unit, coupled to the mutual capacitance sampling unit and the control unit and configured to decode the mutual capacitance signal;
    a self capacitance sampling unit, coupled to a self capacitance decoding unit and the control unit and configured to sample a self capacitance signal;
    the self capacitance decoding unit, coupled to the self capacitance sampling unit and the control unit and configured to decode the self capacitance signal;
    the control unit, coupled to the self capacitance sampling unit, the mutual capacitance decoding unit, the self capacitance sampling unit and the self capacitance decoding unit respectively, and configured to control alternative detections in a mutual capacitance mode and a self capacitance mode;
    a mutual capacitance detecting and determining unit, coupled to the mutual capacitance decoding unit and the control unit respectively, and configured to preliminarily judge whether a touch exists according to the scanning and detecting result in the mutual capacitance mode and send a third signal to the control unit when no touch exists is determined; and
    a self capacitance envelopment analysis unit, coupled to the self capacitance decoding unit and the control unit respectively, and configured to judge whether the touch exists in the mutual capacitance mode and send a fourth signal to the control unit when the touch exists is determined;

wherein the control unit is further coupled to the mutual capacitance detecting and determining unit and the self capacitance envelopment analysis unit respectively, is configured to control the self capacitance envelopment analysis unit to work when receiving the third single sent by the mutual capacitance detecting and determining unit and update no reference when receiving the fourth signal sent by the self capacitance envelopment analysis unit.

\* \* \* \* \*